UNITED STATES PATENT OFFICE 2,466,396

6-MEMBERED HETEROCYCLIC COMPOUNDS

Joseph B. Dickey, Rochester, N. Y., assignor to Eastman Kodak Company, Rochester, N. Y., a corporation of New Jersey No Drawing. Application November 22, 1947, Serial No. 787,620

7 Claims. (Cl. 260—243)

This invention relates to new heterocyclic compounds and to a process for preparing them.

I have discovered that chlorosulfonylacetic acid (HOOCCH₂SO₂Cl) will react with urea or thiourea and certain substituted ureas or thioureas to form a product which when esterified and treated with sodium ethylate cyclizes to give one of the new heterocyclic compounds of my invention. These new compounds have the general formula:

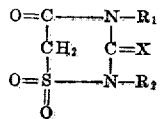

wherein X stands for an oxygen atom or a sulfur atom and $R_1$ and $R_2$ each represent a hydrogen atom, an alkyl group having from one to four, inclusive, carbon atoms, a hydroxyalkyl group having from two to three, inclusive, carbon atoms, an alkoxyalkyl group having from three to four, inclusive, carbon atoms, the phenyl group, or the benzyl group.

The new compounds of my invention are valuable intermediates. They can be coupled with aromatic diazonium compounds to form highly colored azo compounds useful as dyes for the coloration of textile materials.

It is an object of my invention to provide new heterocyclic compounds. Another object of my invention is to provide new heterocyclic compounds useful as coupling components for the preparation of azo dye compounds. A further object is to provide a satisfactory process for preparing the new heterocyclic compounds of my invention.

In order that the steps of the synthesis of the subject compounds may be more easily visualized the following reactions are given:

1. Acylation:

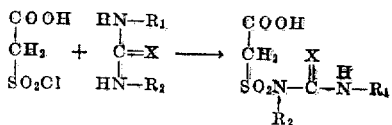

2. Esterification:

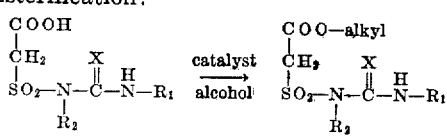

3. Ring-closure:

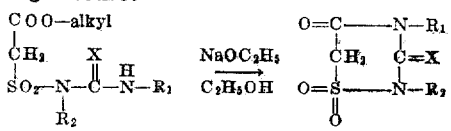

In the reactions indicated above, $R_1$, $R_2$ and $X$ have the meaning previously assigned to them.

In practicing my invention, I prefer to carry out step 1 by mixing together chlorosulfonylacetic acid and the desired urea compound in dry pyridine. After a heating period the solid product is isolated by distilling off the excess pyridine and washing out the pyridine hydrochloride with small portions of cold water. Purification of the product is unnecessary but may be accomplished, for example, by recrystallization from hot water if desired.

The esterification of step 2 is carried out using the well-known technique of azeotropic distillation. For this process a mixture of ethyl alcohol and benzene containing a small amount of an acidic catalyst such as toluene sulfonic acid is employed.

The resulting ester undergoes ring-closure in the presence of a basic condensing agent such as sodium ethylate in alcoholic solution.

The preparation of the compounds of my invention will be illustrated in detail by the following examples.

Example 1

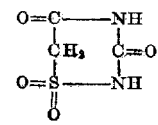

158 grams of chlorosulfonylacetic acid are added to 100 grams of urea in 250 grams of dry pyridine. The temperature is raised to 100° C. over a period of ten hours and then to the boiling point of pyridine (116° C.). Heating under reflux is continued for thirty minutes and then the apparatus is rearranged for distillation. The excess pyridine is removed under reduced pressure, heating being carried out on a steam bath. The resulting solid material is washed with cold water to remove pyridine hydrochloride. If desired, the residue can be purified by recrystallization from hot water or aqueous ethyl alcohol.

The product, ω-carboxymethylsulfonylurea

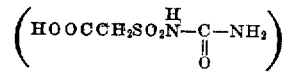

obtained as described above, is transferred to a suitable flask containing one liter of benzene, 100 cc. of ethanol, and 10 grams of para-toluene sulfonic acid. The resulting mixture is distilled until no more water can be detected in small portions of distillate collected from time to time during the distillation. Esterification of the ω-carboxymethylsulfonylurea may then be assumed complete. At this point the residue is carefully neutralized with an aqueous sodium bicarbonate solution, and the excess ethyl alcohol together with benzene is removed by distillation. The residue is broken up, washed with water, and dried.

105 grams of the ester obtained as just described are added to 600 grams of absolute ethanol in which have previously been dissolved 11.5 grams of sodium. Ring closure is effected by heating the reaction mixture under reflux for seven to ten hours. Enough hydrochloric acid is then added to neutralize the sodium ethylate, and the hot solution is filtered to remove sodium chloride. After cooling, the precipitated product is collected by filtration, washed with cold water, and dried.

*Example 2*

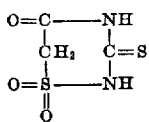

The exact procedure of Example 1 is followed with the exception that 127 grams of thiourea are substituted for the 100 grams of urea used therein. In consequence of this, for the ring closure step, 113 grams of the ester compound formed in this example, are employed instead of the 105 grams of Example 1.

*Example 3*

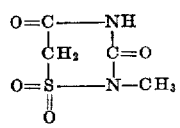

In place of urea, 123 grams of N-methylurea are substituted and reacted exactly in accordance with the procedure described in Example 1 except that 112 grams of the ester formed are used in the ring closure reaction. The resulting compound is believed to have the above formula.

*Example 4*

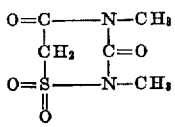

146 grams of N,N'-dimethylurea are substituted for the urea of Example 1 and reacted in exactly the same manner except that in the ring closure step 119 grams of ester formed in this example are used.

Similarly, the corresponding n-propyl disubstituted compound can be made by substituting 240 grams of N,N'-di-n-propylurea for the urea of Example 1, in which case 147 grams of the ester formed are used in the ring closure step.

*Example 5*

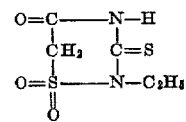

In place of the urea of Example 1, 173 grams of N-ethylthiourea are substituted and reacted exactly in accordance with the procedure of Example 1 except that 127 grams of the ester formed are used in the ring closure reaction.

Similarly, the corresponding n-butyl substituted compound may be prepared by using 220 grams of N-n-butylthiourea in place of the urea of Example 1. In this case 141 grams of the ester formed are used to carry out the ring closure step.

*Example 6*

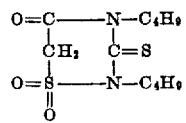

In place of urea 314 grams of N,N'-di-n-butylthiourea undergo the reactions of Example 1 to yield the above compound. In this case 169 grams of the ester formed are used in the ring closure step.

The corresponding ethyl disubstituted compound is prepared by employing 220 grams of N,N'-diethylthiourea in which case 141 grams of the ester formed is ring-closed.

*Example 7*

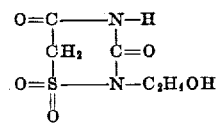

173 grams of N-β-hydroxyethylurea are substituted for the urea of Example 1 and reacted in exactly the same manner. 127 grams of the ester formed are used in the ring-closure step to obtain the compound shown above.

Similarly, 197 grams of N-γ-hydroxypropylurea yield the corresponding γ-hydroxypropyl compound. In this case 134 grams of the ester formed are used in the ring-closure reaction.

*Example 8*

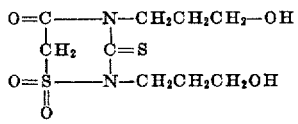

In place of urea 320 grams of N,N'-di-γ-hydroxypropylthiourea undergo the reactions of Example 1 to yield the above compound. 171 grams of the ester formed are used in the ring-closure step.

*Example 9*

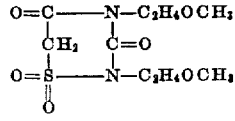

293 grams of N,N'-di-β-methoxyethylurea are substituted for urea in Example 1 and reacted in exactly the same manner. 163 grams of the ester formed are used in the ring-closure step to obtain the compound shown above.

Similarly, 340 grams of N,N'-di-β-ethoxyethylurea yield the corresponding β-ethoxyethylurea disubstituted compound. In this case 177 grams of the ester formed are used in the ring-closure step.

*Example 10*

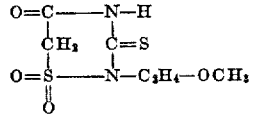

In place of urea 223 grams of N-β-methoxyethylthiourea are substituted in Example 1 and reacted exactly in accordance with the procedure therein described. 142 grams of the ester formed are used in the ring closure step to obtain the compound shown above.

Similarly, 247 grams of N-β-ethoxyethylthiourea are employed to obtain the corresponding β-ethoxyethyl substituted compound. In this case 149 grams of the ester formed are used in the ring-closure step.

*Example 11*

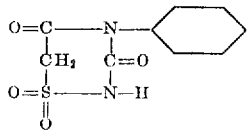

226 grams of N-phenylurea are substituted for the urea of Example 1 and reacted in exactly the same manner. 143 grams of the ester formed are used in the ring-closure step to obtain the compound believed to have the above formula.

Similarly, 250 grams of N-p-tolylurea yield the corresponding p-tolyl substituted compound. 150 grams of the ester formed are used in the ring-closure step.

*Example 12*

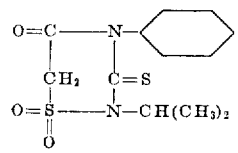

In place of urea in Example 1, 323 grams of N-phenyl-N'-isopropylthiourea are substituted and reacted exactly in accordance with the procedure described therein. 172 grams of the ester formed are used in the ring closure step to obtain the compound believed to have the formula shown above.

Similarly, 347 grams of N-phenyl-N'-n-butylthiourea are employed to produce the corresponding phenyl-butyl disubstituted compound. 179 grams of the ester formed are used in the ring-closure step.

*Example 13*

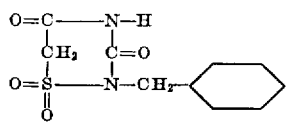

250 grams of N-benzylurea are substituted for the urea of Example 1 and reacted in exactly the same manner. 150 grams of the ester formed are used in the ring-closure step to obtain the compound believed to have the formula shown above.

*Example 14*

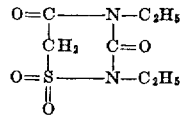

In place of urea in Example 1, 194 grams of N,N'-diethylurea are substituted and treated in exactly the same manner as outlined therein with the exception that 133 grams of the ester formed are used in the ring closure step to obtain the above compound.

The corresponding n-butyl disubstituted compound is prepared similarly by substituting for urea in the procedure described in Example 1, 287 grams of N,N'-di-n-butylurea. In this case 161 grams of the ester formed are used in the ring-closure reaction.

In order that my invention may be more fully understood the preparation of chlorosulfonylacetic acid is described hereinafter.

*Chlorosulfonylacetic acid*

100 grams of thioglycolic acid are added to 500 grams of a water-ice mixture and stirred well. Chlorine gas is passed into the mixture until a small sample taken no longer has the characteristic odor of thioglycolic acid. The mixture is then extracted with several 50 cc. portions of ether and the combined ether solution is dried over anhydrous sodium sulfate. After removing the sodium sulfate by filtration, the ether is removed from the clear filtrate by evaporation. The reidue, chlorosulfonylacetic acid may be purified by distillation under reduced pressure.

By virtue of the reactivity conferred on the two hydrogen atoms of the methylene group due to its situation between a carbonyl group and a sulfonyl group, the new compounds described herein undergo a great variety of chemical reactions. Mention has been made of the coupling reaction with aromatic diazonium compounds to form highly colored azo dyes valuable for the coloration of textile materials and the like. For example, 13.7 grams o-phenetidine when diazotized in known fashion and added to an aqueous alkaline solution of 16.4 grams of the compound prepared in Example 1 couple therewith to produce an azo dye having the formula:

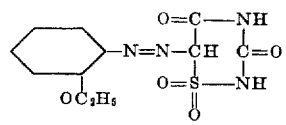

This dye colors cellulose acetate and nylon textile materials yellow shades from an aqueous suspension of the dye.

Azo dye compounds obtained by coupling aromatic diazonium compounds with the new heterocyclic compounds disclosed herein are described and claimed in my copending application, Serial No. 791,657, filed December 13, 1947.

I claim:

1. The compounds having the general formula:

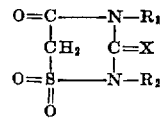

wherein X stands for a member selected from the group consisting of an oxygen atom and a sulfur atom and $R_1$ and $R_2$ each represent a member selected from the group consisting of a hydrogen atom, an alkyl group having from one to four, inclusive, carbon atoms, a hydroxyalkyl group having from two to three, inclusive, carbon atoms, an alkoxyalkyl group having from three to four, inclusive, carbon atoms, the phenyl group, and the benzyl group.

2. The compounds having the formula:

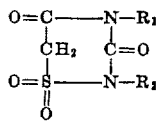

wherein $R_1$ and $R_2$ each represent a member selected from the group consisting of a hydrogen atom, an alkyl group having from two to three, inclusive, carbon atoms, a hydroxyalkyl group having from two to three, inclusive, carbon atoms, an alkoxyalkyl group having from three to four, inclusive, carbon atoms, the phenyl group, and the benzyl group.

3. The compounds having the formula:

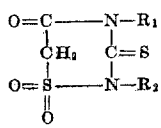

wherein $R_1$ and $R_2$ each represent a member selected from the group consisting of a hydrogen atom, an alkyl group having from one to four, inclusive, carbon atoms, a hydroxyalkyl group having from two to three, inclusive, carbon atoms, an alkoxyalkyl group having from three to four, inclusive, carbon atoms, the phenyl group, and the benzyl group.

4. The compounds having the formula:

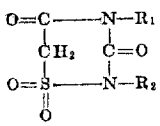

wherein $R_1$ and $R_2$ each represent an alkyl group having one to four, inclusive, carbon atoms.

5. The compound having the formula:

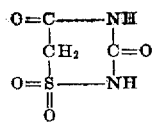

6. The compound having the formula:

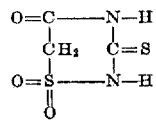

7. The compound having the formula:

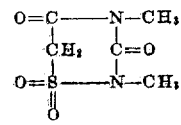

JOSEPH B. DICKEY.

No references cited.